Sept. 8, 1964
K. WEHRLI ETAL
3,147,917
STEP-BY-STEP MECHANISM, IN PARTICULAR FOR
DRIVING DIGIT ROLLERS AND TYPE WHEELS
Filed Nov. 8, 1962
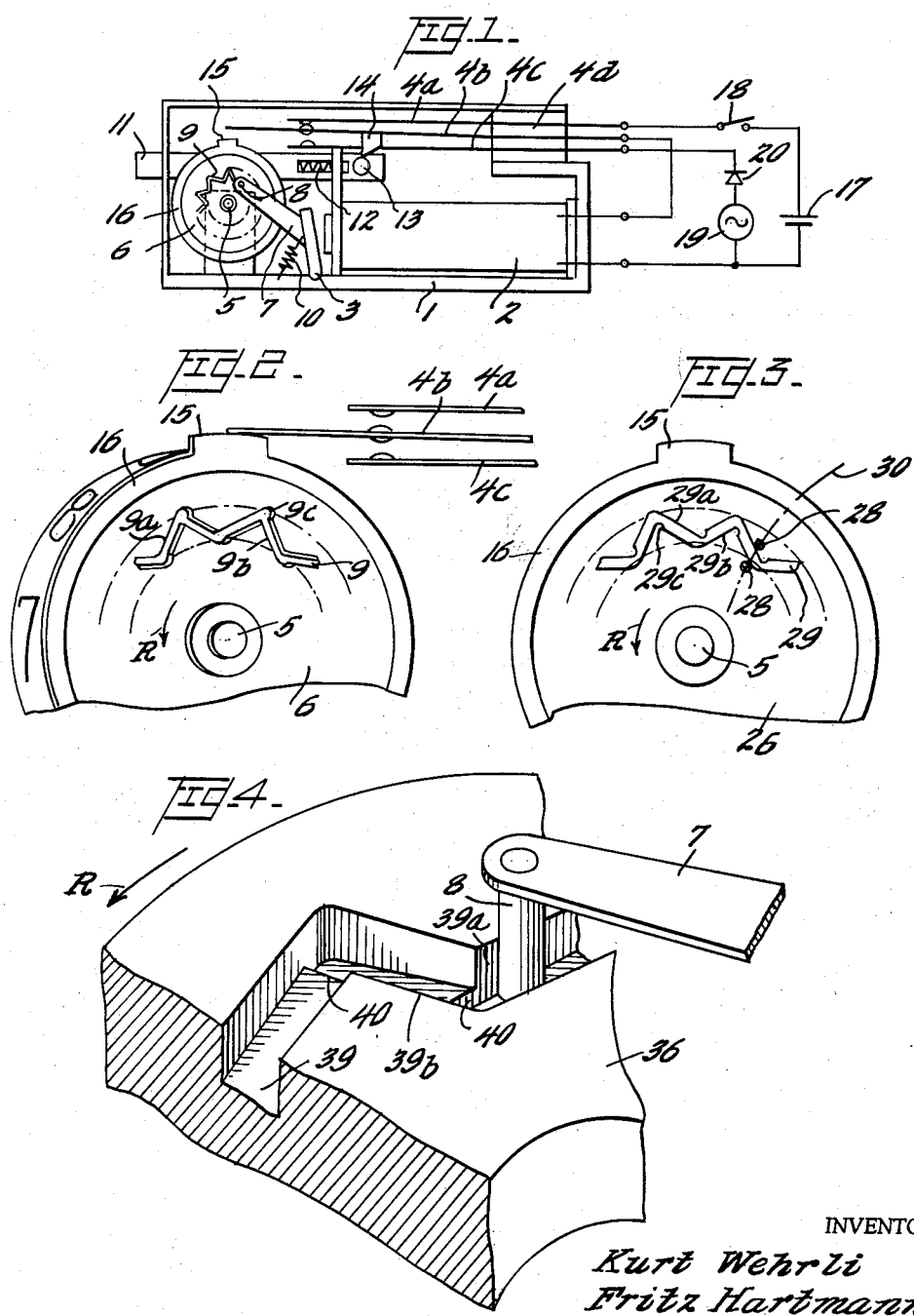
INVENTORS
Kurt Wehrli
Fritz Hartmann,
BY
Watson, Cole, Grindle & Watson
ATTORNEYS United States Patent Office 3,147,917
Patented Sept. 8, 1964

3,147,917
STEP-BY-STEP MECHANISM, IN PARTICULAR FOR DRIVING DIGIT ROLLERS AND TYPE WHEELS
Kurt Wehrli, Herrligstrasse 10, Zurich, Switzerland, and Fritz Hartmann, Wellerstadterweg 31, Baiersdorf, Germany
Filed Nov. 8, 1962, Ser. No. 236,209
Claims priority, application Austria Nov. 10, 1961
2 Claims. (Cl. 235—91)

This invention relates to a step-by-step mechanism which is particularly adapted for driving digit rollers and type wheels, having two annular rims of sliding surfaces, formed on the rotor to be moved forward stepwise, which surfaces in both sets are oppositely inclined and displaced relative to each other, and with a pusher, reciprocable by a driving device by means of stepping pulses, for driving in half-steps by consecutive cooperation with a sliding surface of one rim and a sliding surface of the other rim per pulse.

In a step-by-step mechanism of the type known heretofore, the sliding surfaces are of such design that the pusher cooperative therewith for driving the rotor has to perform a movement in a direction parallel to the rotor axis. As a result, in many cases of application this causes two serious drawbacks: (first) the forces parallel to the axis exert upon the rotor a tilting moment liable for rendering the bearing of the rotor at least difficult, especially if the rotor has a short plain bearing or two bearings arranged a little distance apart from each other. (Second) a multi-roller step-by-step mechanism in which a number of rotors are axially arranged side-by-side and can be driven individually, requires comparatively much room in the axial direction, because between neighboring rotors there must be spaces whose width is at least equal to the sum of the stroke and the thickness of the pusher or of an arm carrying the same. Another drawback of the embodiment known heretofore is seen in that the two rims of sliding surfaces are provided on two workpieces to be made separately. If it were desired to design all sliding surfaces on a one-piece work part, relatively expensive operations would be needed therefor, inasmuch as production in a simple pressure mold seems to be impossible.

The present invention has for its object to obviate the described drawbacks, without the principle of driving in two half-steps per pulse being thereby abandoned. This aim is principally achieved with the step-by-step mechanism according to the invention, in that the sliding surfaces of the two rims are arranged on an axial face of the rotor and are formed substantially by cut-outs of spiral faces originating on the rotor axis, and that the path of movement of the pusher runs substantially radially to the rotor.

The main advantages of the instant invention are:

Together with the oblique sliding surfaces of both rims, the digit or type wheel may be made in a comparatively simple manner in one-piece in a pressure mold, which permits of low cost of manufacture and little weight being obtained. Since the sliding surfaces are designed as flanks of a groove or rib on an axial face of the wheel (or roller), adoption of a simple pressure mold is possible, from which the finished wheel may be ejected in the axial direction.

In multi-wheel counting mechanisms, the path of movement of the pusher, which cooperates with the sliding surfaces and extends substantially radially, has the advantage that between neighboring wheels a space of but slightly more than the thickness of the arm carrying the pusher must be provided, which makes it possible to have a counting mechanism of slight axial overall dimensions.

As the force exerted by the pusher on the sliding surfaces is directed substantially radially to the wheel, the bearing of the latter offers no difficulties, since no unfavorable tilting moments are exerted upon the rotor, such as would be the case with the force acting parallel to the axis.

Further details of the invention will appear from the following description and drawing, taken in conjunction with the accompanying drawing. This shows three forms of embodiment of the object of invention.

FIG. 1 shows diagrammatically in side view a counter designed as step-by-step mechanism with a single digit wheel operable by electric pulses, and also an electric system for the drive and the zero positioning of the counter;

FIG. 2 shows on a larger scale a perspective view of the rotor of the step-by-step mechanism according to FIG. 1, and illustrates the sliding surfaces designed as flanks of a groove;

FIG. 3 shows a part of the second form of embodiment with sliding surfaces designed on a rib;

FIG. 4 shows in perspective view a part of a third form.

Referring to FIG. 1, a yoke 1 has attached thereto an electromagnet 2 whose armature 3 is rockaby supported on yoke 1. Yoke 1, core of electromagnet 2 and armature 3 consist of magnetically conducting material, such as iron, and form the magnetic circuit. Likewise fixed to the yoke 1 is a set of contact springs 4a, 4b, 4c by means of insulating pieces 4d. The center contact spring 4b can cooperate with each of the two others; together with contact spring 4a, it constitutes the first switch and with contact spring 4c a second swich.

An axle 5, extending parallel to the swing axle of armature 3, has rotatably mounted thereon a digit wheel 6 having on its periphery digits, say, from 0–9. Armature 3 has fixed thereto an arm 7 carrying a pin 8 serving as pusher which extends parallel to axle 5 and is so arranged that, as the armature 3 swings, it moves on a path substantially radial to axle 5. Per se a radial movement component of the pin 8 suffices.

One axial face of wheel 6 has a zigzag-shaped endless groove whose design is distinctly visible in FIG. 2. Said groove extends to and fro between two circles differing in diameter and the groove has a width which is somewhat larger than the diameter of pin 8. The latter engages the groove 9 and cooperates with the flanks thereof. These flanks form partly sliding surfaces 9a and 9b, along which the pin 8 slides for driving the wheel 6. Distinction can be made between two groups of sliding surfaces 9a and 9b, the sliding surfaces of each group being arranged in an annular rim. The sliding surfaces 9a of one group are the outer portions of the flanks which, when viewed clockwise in FIG. 2, extend from the circle of smaller diameter to the circle of larger diameter, i.e. are outwardly inclined relative to the circumferential direction. The sliding surfaces 9b of the other group are the inner portions of the flanks which, when viewed clockwise in FIG. 2, extend from the circle of larger diameter to the circle of smaller diameter and hence are inwardly inclined relative to the circumferential direction. Consequently, the sliding surfaces of both groups are oppositely inclined relative to the circumferential direction of the rim and are moreover displaced to each other in said direction, so that the sliding surfaces 9a of one group are opposite the spaces between the sliding surfaces 9b of the other group. The number of sliding surfaces in each group agrees with the number of digits on wheel 6 or with the number of rotary steps provided for one revolution of wheel 6. In the ideal case, each of the sliding surfaces 9a and 9b extends in an Archimedean spiral, whose origin lies in the axis of wheel 6.

Armature 3 is under the influence of a spring 10 which tends to swing it from magnet 2 and to move pin 8 towards axle 5 of wheel 6 by means of the arm 7.

Within the housing of the counter herein described, a slide 11 in FIG. 1 is movably guided in the horizontal direction. Slide 11 is under the influence of a spring 12 which tends to move it to the left. One end of slide 11 projects from the housing of the counter and may be pushed thereinto against the force of spring 12. The other end of the slide carries a roller 13 which cooperates with an inclined face of a cam 14 which is arranged on the center contact spring 4b. In the position of rest of slide 11, the roller 13 and cam 14 cause contact spring 4b to be in contact with the upper contact spring 4a. But by pushing slide 11 in, the center contact spring 4b can be brought into contact with the lower contact spring 4c.

Wheel 6 has rotatably mounted on one side a ring 16 with a cam 15. The latter is designed to cooperate with the center contact spring 4b, if the slide 11 is pushed in against the influence of spring 12. Preferably, spring notches (not shown) are provided adapted to secure the ring 16 in any of several predetermined positions against accidental turning. These positions preferably agree in number with that of the steps provided for one rotation of wheel 6.

According to FIG. 1, the coil of electromagnet 2 and the contact springs 4a, 4b, 4c are connected to different circuits. One circuit, which represents the actual working circuit and is connected to contact spring 4a, includes a source of current 17 and an impulse switch 18 which is closed and opened in some way not described here, in order to cause each time a rotary step of wheel 6. The other circuit is connected to contact spring 4c and includes an automatic impulse transmitter comprising for instance an A.-C. generator 19 and a diode 20.

The action of the described counter is as follows:

Slide 11 is in its position of rest according to FIG. 1. With impulse switch 18 closed, current flows from the source 17 through switch 18, contact springs 4a and 4b, coil of electromagnet 2 and back to the source. Magnet 2 becomes energized and armature 3 is attracted. Pin 8 is constrained to make a movement away from axle 5 of wheel 6, pressing thereby against one of the outer sliding surfaces 9a and sliding outwards thereon, whereby wheel 6 is caused to rotate in the sense of the arrow R in FIG. 2 until the pin reaches the turning point of groove 9. On opening the switch 18, magnet 2 becomes dead, for which reason spring 10 swings armature 3 away from the magnet. Incidentally pin 8 moves towards axle 5 of wheel 6 and slides along an inner sliding surface 9b, whereby wheel 6 again will be given a turn in the sense of the arrow R. Thus wheel 6 will have rotated in two half-steps through a whole rotary step so far that the next following digit of the wheel becomes visible through the window in the housing of the counter. The described operations repeat whenever the impulse switch 18 is closed or opened.

It is understood that any other means known per se could be provided in order to supply the counter with the electric impulses required for rotating the wheel 6.

On pushing slide 11 in against the influence of spring 12, the center contact spring 4b moves clear of the upper contact spring 4a so that the first switch 4a, 4b will be opened. Simultaneously the second switch 4b, 4c closes, since contact spring 4b lies on the lower contact spring 4c, provided that cam 15 is not within the range of contact spring 4b. Now impulse transmitter 19, 20 supplies a sequence of electric pulses via contact springs 4b and 4c to the electromagnet 2 so that wheel 6 automatically rotates stepwise. When cam 15 runs under contact spring 4b, this will be raised from the lower contact spring 4c and thus stop the counter in a predetermined position of rest. The arrangement of cam 15, may, for instance, be such that in the predetermined position of rest of wheel 6, the digit 0 becomes visible in the window of the counter. By turning the ring 16 relative to wheel 6, the position of rest of wheel 6 may be selected and set as described. As long as slide 11 is pressed, the working circuit is separated from the circuit for automatic rotation so that no repercussions on the working circuit are possible. Contact springs 4a and 4b also do not come into contact with each other when cam 15 raises contact spring 4b from the lower contact spring 4c, as may be recognized from FIG. 2, so that creeping current paths to the working circuit are avoided.

To prevent the wheel 6 according to FIG. 1 from "overswinging" and to ensure that it comes to a standstill at once upon each half-step, zigzag-shaped recesses 9c are provided at the turning points of groove 9, in which pin 8 each time finds a firm stop. By this measure, the working speed may be increased further. Similar stop-recesses may be provided on a rib replacing the groove 9.

Wheel 6 may have thereon a sliding contact element (not shown) adapted to cooperate with a rim of stationary lamellae which in number agree with the number of impulses required for one complete rotation of wheel 6. Then, by means of the sliding contact element and contact lamellae, it is possible each time to evaluate the position of the wheel by electric switchings and to utilize it for signals or control operations. Preferably, the sliding contact element may be rotatable relative to the rotor together with cam 15.

Through multiple arrangement of the described counter, a counter can be obtained for indicating from several places or units. In such a case it is preferable to provide on the digit wheels an additional cam which, for transferring a unit to the next higher order, each time produces by means of contact elements a working impulse for rotating a neighboring digit wheel.

In the form of the step-by-step mechanism shown in FIG. 3, a correspondingly shaped rib 29 has been substituted for the groove 9 at one axial face of the type wheel 26. Rib 29 is closed in itself and extends zigzag-shaped to and fro between two circles differing in diameter. Pin 8 of the first form of embodiment is then replaced by a pusher with two pins 28 which are located on either side of rib 29 and reciprocated by a pivotal arm (not shown in FIG. 3) on a path 30 extending substantially radially to the axle 5 of wheel 26. As the pusher with the pins 28 moves towards axle 5, the outer pin 2 slides on an outer flank 29a of rib 29 and thus turns wheel 26 through one half-step in the sense of the arrow R. If consequently the pusher moves away from axle 5, the inner pin 28 presses on one of the inner flanks 29b of rib 29, and this again entails rotation of wheel 26 through one half-step in the sense of the arrow R.

In order to avoid over-swinging of wheel 26 at the end of each half-step, at the turning points of rib 29 sacked-shaped recesses 29c are formed in which the momentary working pin 28 finds a firm stop at the end of its movement so as to avoid further rotation of wheel 26.

In the third form of embodiment according to FIG. 4, the wheel 26, similarly as in the first form, has a zigzag-shaped running groove 39 which is engaged by a pin 8 serving as pusher. In contrast to the design according to FIG. 2, the bottom of groove 39 does not lie in one plane, but is composed of a sequence of inclined planes, all of which rise circumferentially in the opposite sense to arrow R and form steps between them, at which the depth of groove 39 alters abruptly. The steps 40 are disposed at the turning points of groove 39 and are each flush, i.e. perfectly aligned with the groove flanks 39a and 39b serving as sliding surfaces. Pin 8 is resiliently arranged in the axial direction, in that arm 7 is designed as a leaf spring which constantly forces pin 8 with light pressure against the bottom of groove 39.

When pin 8 is reciprocated by means of arm 7 somewhat radially to wheel 36, the wheel undergoes a rotation in the sense of the arrow R in FIG. 4. Incidentally pin 8 slides with one of its ends on one of the gently rising inclined planes of the groove bottom. When pin 8 reaches a turning point of groove 39, it drops under the action of arm 7 down one of the steps 40 onto the next inclined plane of the groove bottom. Thereby a rebounding of wheel 36 contrary to the arrow R is certainly prevented by the step 40 coming into contact with pin 8. The described design of the groove bottom offers the further advantage that the direction of rotation of the wheel 36 is clearly determined, inasmuch as rotation in the reverse sense is rendered impossible by the steps coming into contact with pin 8.

In a modification (not shown) of the form illustrated in FIG. 4, at the turning points of groove 39 additional sack-shaped recesses are provided similar to the recesses 9c of FIG. 2.

Obviously, all described forms of embodiment could be modified in such a manner that pusher 8 or 28 stands still, while wheel 6 or 26 is moved somewhat radially.

The applications of the step-by-step mechanism disclosed hereinbefore are so manifold and may be readily recognized by those skilled in the art, that it is not necessary to describe them further here.

What we claim is:

1. Step-by-step mechanism, in particular for driving digit rollers and type wheels, comprising a rotor having two annular rims of sliding surfaces to be moved forward stepwise, said surfaces in both rims being oppositely inclined and displaced relative to each other, and a driving device and a pusher reciprocable thereby by means of stepping pulses for driving in half-steps by consecutive cooperation with a sliding surface of one rim and a sliding surface of the other rim per pulse, the sliding surfaces of the two rims being disposed on an axial face of the rotor and are formed substantially by cut-outs of spiral faces originating on the rotor axis, the path of movement of the pusher extending substantially radially to the rotor, the sliding surfaces of the two rims being formed by the two flanks of a zigzag-shaped endless groove in an axial face of the rotor, said groove extending to and fro between two circles having different diameters, the pusher cooperative with the sliding surfaces of both rims comprising a pin which extends parallel to the axis of the rotor and engages said groove, the bottom of the groove being composed of a sequence of inclined planes, all of which rise in opposition to the direction of rotation of the rotor, forming steps between them at which the depth of the groove alters abruptly, and the pin engaging said groove being movable in the axial direction and under the action of a spring which constantly maintains said pin in contact with the bottom of said groove.

2. Step-by-step mechanism as defined in claim 1, wherein the steps are arranged at the turning points of the groove and aligned with the flanks of the groove serving as sliding surfaces.

References Cited in the file of this patent

UNITED STATES PATENTS

| | | |
|---|---|---|
| 630,830 | Houghton | Aug. 8, 1899 |
| 1,562,567 | Lepperhoff | Nov. 24, 1925 |
| 2,973,899 | Hegner | Mar. 7, 1961 |

FOREIGN PATENTS

| | | |
|---|---|---|
| 863,091 | France | Dec. 23, 1940 |
| 2,368,874 | France | Feb. 6, 1945 |